United States Patent
Hagimoto et al.

(10) Patent No.: US 10,940,431 B2
(45) Date of Patent: Mar. 9, 2021

(54) RECLAIMING METHOD

(71) Applicant: MITSUBISHI HEAVY INDUSTRIES ENGINEERING, LTD., Yokohama (JP)

(72) Inventors: Akiyori Hagimoto, Tokyo (JP); Tsuyoshi Oishi, Tokyo (JP); Tsutomu Hamada, Tokyo (JP); Atsuhiro Yukumoto, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 0 days.

(21) Appl. No.: 16/580,306

(22) Filed: Sep. 24, 2019

(65) Prior Publication Data

US 2020/0016529 A1 Jan. 16, 2020

Related U.S. Application Data (62) Division of application No. 15/110,829, filed as application No. PCT/JP2015/050264 on Jan. 7, 2015, now Pat. No. 10,471,379.

(30) Foreign Application Priority Data

Jan. 17, 2014 (JP) .................................. 2014-007267

(51) Int. Cl.
*B01D 53/14* (2006.01)
*B01D 61/44* (2006.01)
(Continued)

(52) U.S. Cl.
CPC ..... *B01D 53/1425* (2013.01); *B01D 53/1462* (2013.01); *B01D 53/1493* (2013.01);
(Continued)

(58) Field of Classification Search
None
See application file for complete search history.

(56) References Cited

U.S. PATENT DOCUMENTS

| 4,624,839 A | 11/1986 | Wolcott et al. |
| 8,888,923 B2 * | 11/2014 | Underwood .............. A61L 2/18 134/22.1 |

(Continued)

FOREIGN PATENT DOCUMENTS

| JP | 5-31483 A | 2/1993 |
| JP | 5-245339 A | 9/1993 |

(Continued)

OTHER PUBLICATIONS

International Search Report, w/English translation and Written Opinion dated Feb. 10, 2015, issued in counterpart International Application No. PCT/JP2015/050264 (12 pages).

(Continued)

*Primary Examiner* — Christopher P Jones
*Assistant Examiner* — Phillip Y Shao
(74) *Attorney, Agent, or Firm* — Westerman, Hattori, Daniels & Adrian, LLP (57) ABSTRACT

A reclaiming method is disclosed including conducting evaporation by introducing a part of the absorbent to recover $CO_2$ or $H_2S$ in a gas in a closed system recovery unit and separating a degraded substance contained in the absorbent from the absorbent to be introduced into an evaporator and obtain recovery steam containing an absorbent and $CO_2$ or $H_2S$ by a heating section that is provided on a circulation line that circulates in the evaporator; and removing ionic degraded substance by cooling the concentrate obtained in the evaporation and removing an ionic degraded substance in the concentrate after the cooling, wherein a purified (Continued)

concentrate from which the ionic degraded substance has been removed is reused as a purified absorbent.

4 Claims, 6 Drawing Sheets

(51) Int. Cl.
    *C02F 1/42*     (2006.01)
    *C02F 1/04*     (2006.01)
    *C02F 1/469*     (2006.01)
    *B01J 41/04*     (2017.01)
    *B01J 39/04*     (2017.01)
    *B01J 49/00*     (2017.01)
    *B01J 49/50*     (2017.01)
    *B01J 47/00*     (2017.01)
    *C02F 1/32*     (2006.01)
    *C02F 103/18*     (2006.01)

(52) U.S. Cl.
    CPC .............. *B01D 61/44* (2013.01); *B01J 39/04* (2013.01); *B01J 41/04* (2013.01); *B01J 47/00* (2013.01); *B01J 49/00* (2013.01); *B01J 49/50* (2017.01); *C02F 1/048* (2013.01); *C02F 1/325* (2013.01); *C02F 1/42* (2013.01); *C02F 1/4693* (2013.01); *B01D 2252/204* (2013.01); *B01D 2252/20478* (2013.01); *B01D 2256/24* (2013.01); *B01D 2257/304* (2013.01); *B01D 2257/504* (2013.01); *B01D 2258/02* (2013.01); *B01D 2258/0283* (2013.01); *B01D 2311/2619* (2013.01); *B01D 2311/2653* (2013.01); *B01D 2311/2673* (2013.01); *C02F 1/32* (2013.01); *C02F 2103/18* (2013.01); *C02F 2303/16* (2013.01); *Y02C 20/40* (2020.08)

(56) References Cited

U.S. PATENT DOCUMENTS

| | | |
|---|---|---|
| 2007/0148068 A1 | 6/2007 | Burgers et al. |
| 2009/0193970 A1 | 8/2009 | Iijima |
| 2012/0235087 A1 | 9/2012 | Handagama et al. |
| 2014/0248206 A1 | 9/2014 | Tsujiuchi et al. |

FOREIGN PATENT DOCUMENTS

| | | |
|---|---|---|
| JP | 2008-238113 A | 10/2008 |
| JP | 2009-521314 A | 6/2009 |
| JP | 2012-106193 A | 6/2012 |
| JP | 2013-173114 A | 9/2013 |
| JP | 2013-184079 A | 9/2013 |
| JP | 2013-186091 A | 9/2013 |
| WO | 2012/129001 A1 | 9/2012 |
| WO | 2013/143001 A1 | 10/2013 |
| WO | 2014/136599 A1 | 9/2014 |

OTHER PUBLICATIONS

Translation of Written Opinion dated Feb. 10, 2015, issued in counterpart International Patent Application No. PCT/JP2015/050264. (6 pages).

\* cited by examiner

RECLAIMING METHOD

CROSS-REFERENCE TO RELATED APPLICATION

This application is a divisional of U.S. application Ser. No. 15/110,829, filed on Jul. 11, 2016, and wherein U.S. application Ser. No. 15/110,829 is a national stage application filed under 35 U.S.C. § 371 of International Application No. PCT/JP2015/050264, filed Jan. 7, 2015, which is based upon and claims the benefit of priority of the prior Japanese Patent Application No. 2014-007267, filed on Jan. 17, 2014, the entire contents of which are incorporated herein by reference.

FIELD

The present invention relates to a reclaiming device, a reclaiming method, and a recovery unit for $CO_2$ or $H_2S$ or both.

BACKGROUND

In recent years, the greenhouse effect due to $CO_2$ is pointed out as a factor of global warming, and thus the measure to cope with this has become an international urgent task in order to protect the global environment. The $CO_2$ generation sources include a various fields of human activities that burn fossil fuels, and a demand for emission limitation of $CO_2$ tends to be even stronger. In association with this, a method to remove and recover $CO_2$ in the flue gas by bringing the flue gas from a boiler into contact with an amine-based $CO_2$ absorbent such as an aqueous alkanolamine solution or a method to store the recovered $CO_2$ without releasing it to the atmosphere has been extensively investigated by taking the power generation facilities such as thermal power plants that use great amounts of fossil fuels as the target.

Hitherto, a method to remove $CO_2$ (carbon dioxide) and SOx (sulfur oxides) in the flue gas is disclosed in Patent Literature 1. This method includes a denitrifying step of conducting the denitrification treatment by reducing NOx (nitrogen oxides) contained in the flue gas, a desulfurizing step of conducting the desulfurization treatment by bringing SOx contained in the flue gas into contact with calcium carbonate in the slurry, a $CO_2$ removing step of absorbing $CO_2$ in the flue gas to an absorbent by bringing the flue gas which has been subjected to the denitrification treatment and the desulfurization treatment into countercurrent contact with an amine-based absorbent (aqueous alkanolamine solution) in the absorber, and an absorbent regenerating step of obtaining a lean solution obtained by removing $CO_2$ from the rich solution having $CO_2$ absorbed in the regenerator and returning the solution to the absorber again. Moreover, in this method, reclaiming in which the absorbent is heated by a reclaimer to concentrate the coexist substance as sludge and the degraded substance is removed from the absorbent is conducted in order to prevent a situation in which degraded substances including a thermally stable salt produced through the oxidation degradation of the alkanolamine by the oxygen in the flue gas or the reaction of the alkanolamine with the remaining NOx or the remaining SOx and a solid such as smoke dust contained in the flue gas are accumulated in the system through which the absorbent passes.

CITATION LIST

Patent Literature

Patent Literature 1: Japanese Patent Application Laid-open No. 5-245339

SUMMARY

Technical Problem

Meanwhile, examples of the reclaiming device of the prior art may include a reclaiming device by (vacuum) distillation, a reclaiming device using an ion exchange resin, and a reclaiming device using electrodialysis, but they have the following problems.

For example, in the proposal by the reclaiming device using a (vacuum) distillation method, there is a problem that the operability is relatively poor, the cost of the device is likely to increase particularly in the case of vacuum distillation. In addition, there is a problem that the degradation of the absorbent due to heat is occurred.

In addition, there is a problem that the nonionic degraded substance cannot be removed by only the reclaiming device using an ion exchange resin method or an electrodialysis method. In addition, in the reclaiming device using an ion exchange resin method, there is a problem that the reclaiming device cannot sufficiently exhibit the capability when the concentration of the absorbent component ($CO_2$ concentration) is high. Moreover, there is a problem that the reclaiming device generally consumes a great amount of water and chemical, and generates a great amount of effluent which contains an amine and has difficulties in treatment.

Furthermore, in the reclaiming device using an electrodialysis method, there is a problem that the electrodialysis effect cannot be sufficiently exhibited in a case where the concentration of the absorbent component ($CO_2$ concentration) is high or the concentration of the degraded substance is low, or in both the cases.

It is easily expected that the effect of the various problems described above is greater than ever since the amounts of effluent and waste increase in proportion to an increase in size of the acidic gas removal device and the reclaiming device itself is also increased in size.

Hence, the appearance of a reclaiming device is eagerly desired which is easily applied to a large scale acidic gas removal device in the future and can continuously purify the absorbent while managing the degraded substance in the absorbent at a low concentration.

In view of the above problems, an object of the present invention is to provide a reclaiming device which is easily applied to a large scale acidic gas removal device and can continuously purify the absorbent while managing the degraded substance in the absorbent at a low concentration, a reclaiming method, and a recovery unit for $CO_2$ or $H_2S$ or both.

Solution to Problem

A first aspect of the invention in order to solve the problem is a reclaiming device including an evaporator that introduces a part of an absorbent to recover $CO_2$ or $H_2S$ in a gas in a closed system recovery unit through an introduction line and separates a degraded substance contained in the absorbent from the absorbent, a heating section that heats the absorbent introduced into the evaporator to obtain recovery steam containing an absorbent and $CO_2$ or $H_2S$, a recovery steam discharge line that discharges the recovery steam from a top side of the evaporator, a concentrate drawing off line that draws off a concentrate from a bottom side of the evaporator, a cooler that is interposed on a branch line branched off from a part of the concentrate drawing off line and cools the concentrate, and an ionic degraded substance removal section that removes an ionic degraded substance in the cooled concentrate, wherein a purified concentrate from which the ionic degraded substance has been removed is reused as a purified absorbent.

A second aspect of the invention is the reclaiming device according to the first aspect, including a concentrated waste water discharge line that is branched off from the branch line and discharges a concentrated waste water, and a first on-off valve that is provided between the branched portion of the concentrated waste water discharge line and the cooler, wherein an absorbent containing a degraded substance is concentrated in the evaporator by closing the first on-off valve to concentrate the degraded substance and the concentrated waste water is discharged to the outside through the concentrated waste water discharge line.

A third aspect of the invention is the reclaiming device according to the first or the second aspect, wherein the ionic degraded substance removal section is an electrodialyser or an ion exchange resin device.

A fourth aspect of the invention is the reclaiming device according to the third aspect, in the case where the ionic degraded substance removal section is an ion exchange resin device, including a chemical introduction section that introduces a regenerating chemical to the ion exchange resin device, and a recirculation line that branches off a resin-regenerated waste liquid obtained by regenerating an ion exchange resin with the introduced chemical from a purified absorbent discharge line and recirculates the resin-regenerated waste liquid to the evaporator side, wherein the ion exchange resin is regenerated by regenerating the ion exchange resin with a regenerating chemical as well as stopping the introduction and discharge of the absorbent and concentrating the resin-regenerated waste liquid in the evaporator while returning the resin-regenerated waste liquid to the evaporator.

A fifth aspect of the invention is the reclaiming device according to any one of the first to fourth aspects, including an ultraviolet irradiation section that decomposes a nonionic degraded substance, which is provided downstream of the ionic degraded substance removal section.

A sixth aspect of the invention is a recovery unit for $CO_2$ or $H_2S$ or both, including an absorber that brings a gas containing $CO_2$ or $H_2S$ or both into contact with an absorbent and removes $CO_2$ or $H_2S$ or both, an absorbent regenerator that regenerates a solution that has absorbed $CO_2$ or $H_2S$ or both to obtain an absorbent, and the reclaiming device according to any one of the first to fifth aspect which draws off a part of the absorbent regenerated in the absorbent regenerator and removes a coexisting substance in the absorbent, wherein recovery steam recovered from the reclaiming device is introduced into the regenerator as well as the absorbent regenerated in the absorbent regenerator circulates and is reused in the absorber.

A seventh aspect of the invention is a reclaiming method including conducting evaporation by introducing a part of the absorbent to recover $CO_2$ or $H_2S$ in a gas in a closed system recovery unit and separating a degraded substance contained in the absorbent from the absorbent to obtain recovery steam containing an absorbent and $CO_2$ or $H_2S$, and removing ionic degraded substance by cooling the concentrate obtained in the evaporation and removing an ionic degraded substance in the concentrate after the cooling, wherein a purified concentrate from which the ionic degraded substance has been removed is reused as a purified absorbent.

An eighth aspect of the invention is the reclaiming method according to the seventh aspect, wherein a degraded substance contained in the absorbent is concentrated in an evaporator and discharged.

A ninth aspect of the invention is the reclaiming method according to the seventh or the eighth aspect, wherein the removing the ionic degraded substance is electrodialysis or an ion exchange resin.

The tenth aspect of the invention is the reclaiming method according to the ninth aspect, wherein, in the case where the removing the ionic degraded substance is the ion exchange resin, the ion exchange resin is regenerated by introducing a regenerating chemical into the ion exchange resin and concentrating a resin-regenerated waste liquid obtained by regenerating the ion exchange resin with the introduced chemical on the evaporator side.

The eleventh aspect of the invention is the reclaiming method according to any one of the seventh to the tenth aspects, including irradiating an ultraviolet to decompose a nonionic degraded substance on a downstream side of the ionic degraded substance removal section.

Advantageous Effects of Invention

According to the present invention, the absorbent is almost continuously recovered through evaporation and the ionic degraded substance contained in the absorbent is removed by drawing off a part of the absorbent that is circulated and used in a recovery unit for $CO_2$ or $H_2S$ or both, and thus it is possible to maintain stable liquid properties of the absorbent at all times and to more stably run the recovery unit for $CO_2$ or $H_2S$, or both, than in the prior art.

In addition, it is possible to continuously and efficiently remove the degraded substance, and thus it is possible to miniaturize the constituent elements of the reclaiming device and it is easy to apply the reclaiming device to a large scale recovery unit for $CO_2$ or $H_2S$ or both.

DESCRIPTION OF EMBODIMENTS

Hereinafter, preferred Embodiments of the present invention will be described in detail with reference to the accompanying drawings. Incidentally, the present invention is not limited by the Embodiments, and the present invention includes those configured by combining the respective Embodiments when there is a plurality of Embodiments.

Embodiment 1

Figure 1:
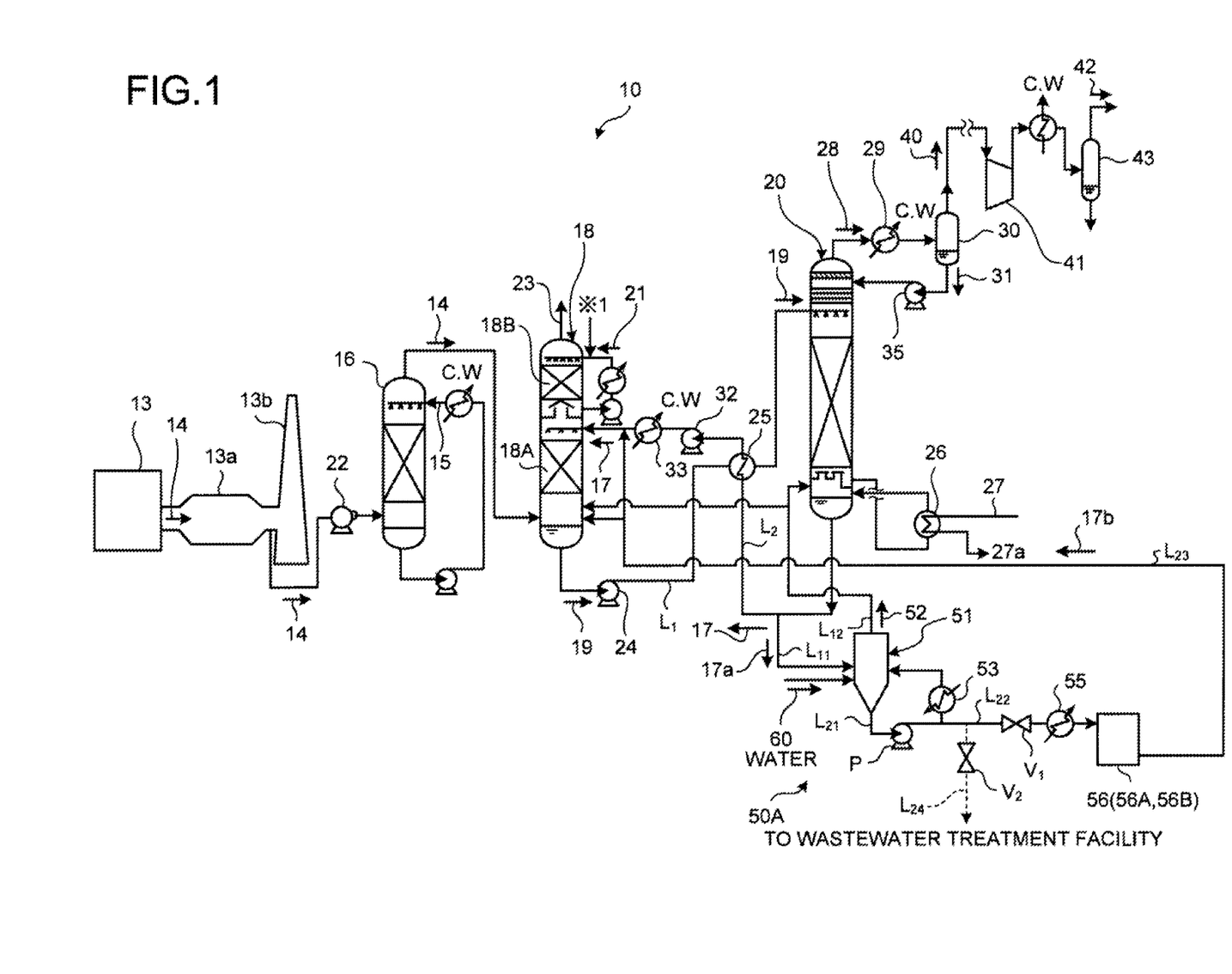
FIG. 1 is a schematic diagram of a $CO_2$ recovery unit including a reclaiming device according to Embodiment 1.
Figure 2:
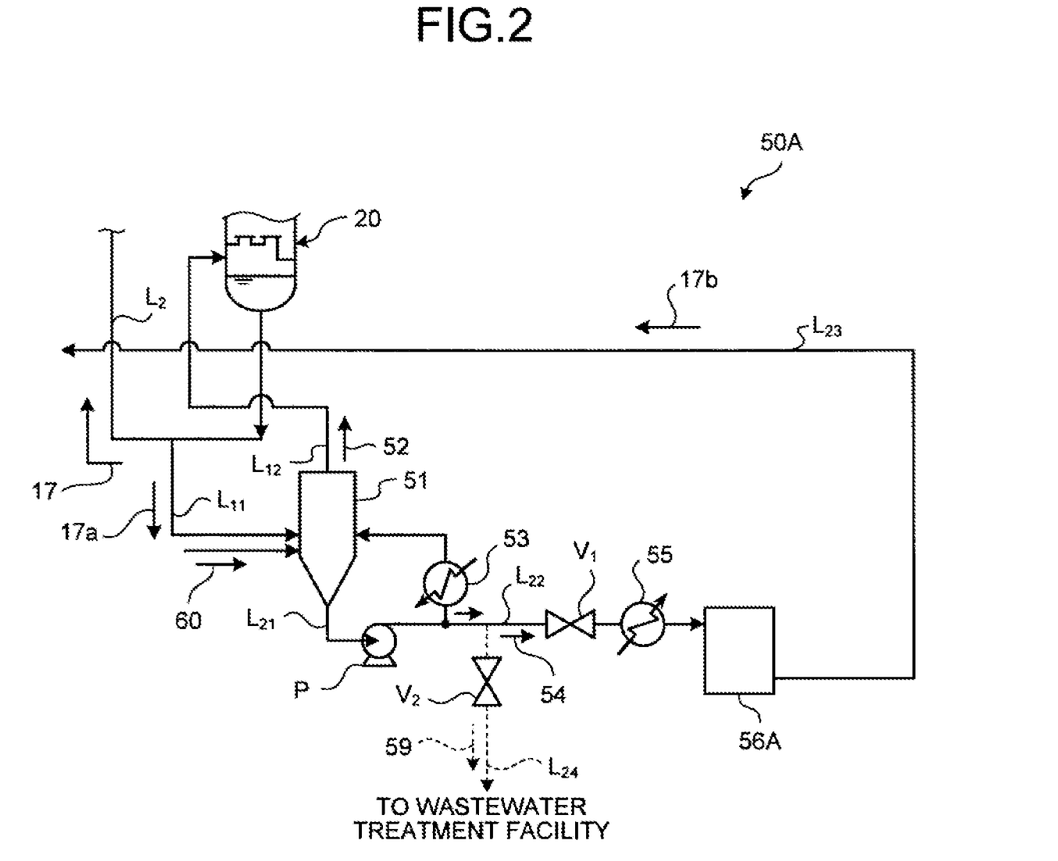
FIG. 2 is a schematic diagram of a reclaiming device according to Embodiment 1.

FIG. 1 is a schematic diagram of a $CO_2$ recovery unit including a reclaiming device according to Embodiment 1. FIG. 2 is a schematic diagram of the reclaiming device according to Embodiment 1.

The process that can be employed in the method for removing $CO_2$ or $H_2S$ or both in a gas of the present invention is not particularly limited, but an example of a removal device for removing $CO_2$ will be described with reference to FIG. 1.

Examples of the gas to be treated by the present invention may include coal gas produced by gasification, syngas, coke oven gas, petroleum gas, natural gas, and flue gas, but it is not limited thereto, and the gas may be any gas as long as it is a gas containing an acidic gas such as $CO_2$ or $H_2S$.

In the following Embodiments, a flue gas containing $CO_2$ will be described as the acidic gas.

As illustrated in FIG. 1, a $CO_2$ recovery unit 10 according to Embodiment 1 includes a flue gas cooler 16 to cool a flue gas 14 that is discharged from an industrial combustion facility 13 such as a boiler or a gas turbine and contains $CO_2$ and $O_2$ with cooling water 15, a $CO_2$ absorber 18 to have a $CO_2$ recovery section 18A to remove $CO_2$ from the flue gas 14 by bringing the flue gas 14 that is cooled and contains $CO_2$ into contact with a $CO_2$ absorbent (hereinafter, also referred to as the "absorbent") 17 to absorb $CO_2$, and an absorbent regenerator 20 which regenerates the $CO_2$ absorbent by releasing $CO_2$ from the $CO_2$ absorbent (hereinafter, also referred to as the "rich solution") 19 which has absorbed $CO_2$. Moreover, in this $CO_2$ recovery unit 10, the regenerated $CO_2$ absorbent (hereinafter, also referred to as the "lean solution") 17 from which $CO_2$ has been removed in the absorbent regenerator 20 is reused in the $CO_2$ absorber 18 as a $CO_2$ absorbent.

Incidentally, in FIG. 1, the reference signs 13a, 13b, and 27a denote a flue gas duct, a stack, and steam condensed water, respectively. The $CO_2$ recovery unit 10 is additionally provided in order to recover $CO_2$ from an already provided flue gas source in some cases, and it is simultaneously installed along with a new flue gas source in some cases. An openable damper is installed to the duct inlet portion to guide the flue gas from the stack 13b or the flue gas duct 13a to the $CO_2$ recovery unit 10, and it is open at the time of running the $CO_2$ recovery unit 10. In addition, the damper is set to be closed when the running of the $CO_2$ recovery unit 10 is stopped although the flue gas source is working.

In the $CO_2$ recovery method using the $CO_2$ recovery unit 10, first, the flue gas 14 that is emitted from the industrial combustion facility 13 such as a boiler or a gas turbine and contains $CO_2$ is pressurized by a flue gas blower 22, sent to the flue gas cooler 16, cooled here with cooling water 15, and then sent to the $CO_2$ absorber 18.

In the $CO_2$ absorber 18, the flue gas 14 is brought into countercurrent contact with the $CO_2$ absorbent 17 that is an amine absorbent according to the present Embodiment and $CO_2$ in the flue gas 14 is absorbed into the $CO_2$ absorbent 17 by a chemical reaction.

The $CO_2$-removed flue gas from which $CO_2$ has been removed in the $CO_2$ recovery section 18A is brought into gas-liquid contact with washing water 21 which contains the $CO_2$ absorbent supplied through the nozzle and circulates in a water washing section 18B in the $CO_2$ absorber 18, the $CO_2$ absorbent 17 accompanying the $CO_2$-removed flue gas is recovered, and a flue gas 23 from which $CO_2$ has been removed is then released out of the system.

In addition, the rich solution of the $CO_2$ absorbent 19 which has absorbed $CO_2$ is pressurized by a rich solution pump 24, heated with the lean solution of the $CO_2$ absorbent 17 that is regenerated in the absorbent regenerator 20 in a rich-lean solution heat exchanger 25 disposed on a rich solution supply line $L_1$, and then supplied to the absorbent regenerator 20.

The rich solution 19 that is released from the upper portion to the inside of the absorbent regenerator 20 is subjected to an endothermic reaction by the water steam supplied from the bottom so as to release most of $CO_2$. The $CO_2$ absorbent which has released a part of $CO_2$ in the absorbent regenerator 20 is called a semi-lean solution. This semi-lean solution becomes the $CO_2$ absorbent (lean solution) 17 from which most of $CO_2$ has been removed when it reaches the bottom of the absorbent regenerator 20. A part of this lean solution 17 is heated with water steam 27 in a regenerating heater 26 to supply the water steam to the inside of the absorbent regenerator 20.

Meanwhile, a $CO_2$-accompanied gas 28 that is accompanied by the water steam released from the rich solution 19 and the semi-lean solution in the absorbent regenerator is derived from the top of the absorbent regenerator 20, the steam is condensed by a condenser 29, water is separated by a separation drum 30, and a $CO_2$ gas 40 is released out of the system, compressed by a separate compressor 41, and recovered. This $CO_2$ gas 42 that has been compressed and recovered passes through a separation drum 43, and then, for example, pressed into an oil field by using the enhanced oil recovery (EOR) method or, for example, stored in an aquifer so as to cope with global warming. Incidentally, it may be recovered as a $CO_2$ gas product.

Reflux water 31 that is separated from the $CO_2$-accompanied gas 28 that is accompanied by water steam by the separation drum 30 and refluxed is supplied to the upper portion of the absorbent regenerator 20 and the washing water 21 side, respectively, by a reflux water circulation pump 35.

The regenerated $CO_2$ absorbent (lean solution) 17 is cooled with the rich solution 19 by the rich-lean solution heat exchanger 25 interposed at the intersection of the rich solution supply line $L_1$ with a lean-solution supply line $L_2$, subsequently pressurized by a lean solution pump 32, further cooled by a lean solution cooler 33, and then supplied to the $CO_2$ absorber 18. Incidentally, in this embodiment, only the outline is described and the description on some of the attached instruments is not provided.

A part of the absorbent 17 that has been regenerated in the absorbent regenerator 20 is branched off from the lean-solution supply line $L_2$ to an introduction line $L_{11}$, introduced into an evaporator 51 of a reclaiming device 50A, and indirectly heated so that the coexisting substance is separated therefrom. Incidentally, the introduction line $L_{11}$ may be installed to the back of the lean solution pump 32.

FIG. 2 is a schematic diagram of the reclaiming device according to Embodiment 1.

As illustrated in FIG. 2, the reclaiming device 50A according to the present Embodiment is equipped with the evaporator 51 to introduce a part 17a of the absorbent 17 which recovers $CO_2$ in the flue gas 14 in the closed system $CO_2$ recovery unit and circulates through the introduction line $L_{11}$ and to continuously evaporate the absorbent 17 that has been branched and introduced by heat, a heating section 53 interposed on a circulation line $L_{21}$ to circulate the absorbent 17 into the evaporator 51 again and to obtain gaseous recovery steam 52 containing the vaporized absorbent and $CO_2$ by heating the circulating absorbent 17 as well as to draw off the absorbent 17 introduced into this evaporator 51 from the bottom, a recovery steam discharge line $L_{12}$ to discharge the recovery steam 52 from the top side of the evaporator 51, a concentrate branch line $L_{22}$ to branch off a part of the absorbent 17 circulating through the circulation line $L_{21}$ at the bottom of the evaporator 51 from the circulation line $L_{21}$ as a concentrate 54, a cooler 55 interposed on this concentrate branch line $L_{22}$ to cool the concentrate 54, an ionic degraded substance removal section 56 to remove an ionic degraded substance in the concentrate 54 after the cooling, and a purified absorbent discharge line $L_{23}$ to reuse the concentrate 54 as a purified absorbent 17b from which the ionic degraded substance has been removed. In FIG. 1, the reference sign $L_{24}$ denotes a concentrated waste water line to discharge concentrated waste water 59 from the concentrate branch line $L_{22}$, $V_1$ and $V_2$ denote the first and second on-off valves, respectively, P denotes the circulation pump, and 60 denotes water.

In the present Embodiment, the absorbent is evaporated by being indirectly heated from the outside by the heating section 53 interposed on the circulation line $L_{21}$, but the present invention is not limited thereto, and for example, a heater may be inserted in the inside of the evaporator 51 so as to evaporate the absorbent or the water steam may be directly introduced into the evaporator 51 to heat the absorbent. In addition, the evaporator 51 may be a vacuum system in order to further separate the degraded substance from the absorbent component.

In the present Embodiment, during the running of the $CO_2$ recovery unit 10 illustrated in FIG. 1, the part 17a of the absorbent 17 is introduced into the evaporator 51 through the introduction line $L_{11}$ and this branched and introduced absorbent 17 is heated by the heater 53.

In this evaporator 51, most of the amine solution that is a component in the absorbent and most of $CO_2$ are removed through vaporization and the degraded substance (ionic degraded substance and nonionic degraded substance) is concentrated.

Hence, the degraded substance including an ionic degraded substance and a nonionic degraded substance is gradually concentrated in the absorbent 17 circulating through the circulation line $L_{21}$ as the recovery steam 52 is recovered from the top side. Incidentally, it is also considered to return the recovery steam 52 to the $CO_2$ absorber 18 in a case where the recovery steam 52 cannot be returned to the absorbent regenerator 20 in consideration of the pressure balance.

This concentrated concentrate 54 is cooled to a predetermined temperature by the cooler 55 provided on the concentrate branch line $L_{22}$ and then sent to the ionic degraded substance removal section 56 to be described later, and the separation treatment of ionic degraded substance is conducted here.

Examples of the ionic degraded substance removal section 56 may include an electrodialysis device 56A or an ion exchange resin device 56B.

FIG. 2 illustrates the case of applying the electrodialysis device 56A as the ionic degraded substance removal section 56.

The electrodialysis device 56A can use a known electrodialysis membrane, and it separates the ionic substance dissolved in the concentrate 54 so as to purify the concentrate 54.

Removal Operation of Ionic Degraded Substance

It is possible to maintain the concentration of the ionic degraded substance in the absorbent 17 to be low by allowing the absorbent 17 to pass through this electrodialysis device 56A. As a result, it is possible to suppress an increase in boiling point of the absorbent 17 due to the accumulation of the ionic degraded substance in the evaporator 51 and to extend the running period of the evaporator 51.

In other words, the concentrate 54 passes through the electrodialysis device 56A so as to be purified, passes through the purified absorbent discharge line $L_{23}$ as the purified absorbent 17b, and then circulates in the $CO_2$ absorber 18 and the absorbent regenerator 20 as the lean solution 17 of a regenerated absorbent.

Thereafter, the absorbent circulates and is reused in a closed system when the running by the $CO_2$ recovery unit 10 continues and the purification of the absorbent by the reclaiming operation continues, and thus the nonionic degraded substance that cannot be removed in the electrodialysis device 56A gradually accumulates in the absorbent 17.

Hence, the operation to discharge the nonionic degraded substance from the system is conducted when the concentration of the nonionic degraded substance in the absorbent 17 is determined to be a predetermined concentration.

Removal Operation of Nonionic Degraded Substance

The first on-off valve $V_1$ in front of the cooler 55 is closed when the time course of the absorbent 17 is analyzed and, as a result of the measurement, it is determined that the nonionic degraded substance is accumulated in the absorbent. The nonionic degraded substance is concentrated in the evaporator 51, and the concentrated waste water 59 is discharged therefrom by opening the second on-off valve $V_2$ that interposed on the concentrated waste water line $L_{24}$, introduced into the wastewater treatment facility, and subjected to the wastewater treatment here.

In other words, it is possible to remove a predetermined amount of the absorbent from the system via the concentrated waste water line $L_{24}$ as the concentrated waste water 59 while concentrating the nonionic degraded substance by conducting the circulation running of the absorbent in the circulation line $L_{21}$ at the bottom of the evaporator 51.

Here, in the prior art, a constant amount of absorbent is introduced into a kettle type reclaimer and continuously heated by a heater for a constant time to concentrate the degraded substance, and thus the degradation of the absorbent introduced into the kettle type reclaimer proceeds with time.

In contrast, according to the present Embodiment, the absorbent 17 is heated only for the contact time when it passes through the heating section 53, and thus the heating and contact time is significantly shortened and the thermal degradation of amine is suppressed.

In addition, the absorbent component and the $CO_2$ gas are removed as recovery steam 52 in the evaporator 51, and thus it is possible to use a general purpose membrane without being modified for an absorbent (for example, modified for the case of including $CO_2$) as the electrodialysis membrane of the electrodialysis device 56A.

In addition, the degradation of the absorbent due to heat of the absorbent is prevented, a long-term continuous running of the reclaiming device is realized, and the processing quantity per unit time decreases, and thus it is possible to achieve a decrease in size of the reclaiming device.

In addition, when the concentration of the nonionic substance which cannot be removed in the electrodialysis device 56A has increased, the introduction of the absorbent into the electrodialysis device 56A is once stopped, the absorbent can be concentrated by being circulated in the evaporator 51, and can be removed as the concentrated waste water 59.

In addition, in order to conduct the reclaiming running of a conventional kettle type reclaiming device over a long period of time, it is required to increase the liquid retention amount of the absorbent to be introduced into the reclaiming device so as to suppress an increase in boiling point of the absorbent due to the concentration of the ionic degraded substance.

In contrast, in the present Embodiment, most of the absorbent and most of $CO_2$ are removed through vaporization as the recovery steam 52 in the evaporator 51, thereafter the ionic degraded substance accumulated in the absorbent 17 is continuously removed in the electrodialysis device 56A, and thus it is possible to regenerate the absorbent with a compact device.

In a conventional kettle type reclaiming device, a batch processing is usually conducted, and thus it is required to remove the degraded substance as a residue after the vaporization of the absorbent introduced into the reclaiming device is completed.

In contrast, in the present Embodiment, most of the absorbent and most of $CO_2$ are removed through vaporization as the recovery steam 52 in the evaporator 51, thereafter the ionic degraded substance accumulated in the absorbent 17 is continuously removed in the electrodialysis device 56A, and thus it is possible to purify the absorbent with a compact device. Moreover, the concentration of the nonionic degraded substance is individually conducted by using the evaporator 51 after the introduction of the concentrate to the electrodialysis device 56A is separately stopped, thereafter the nonionic degraded substance is removed as the concentrated waste water 59, and thus it is possible to conduct a continuous purification treatment of the absorbent as well as to decrease the thermal degradation of the absorbent.

Figure 5:
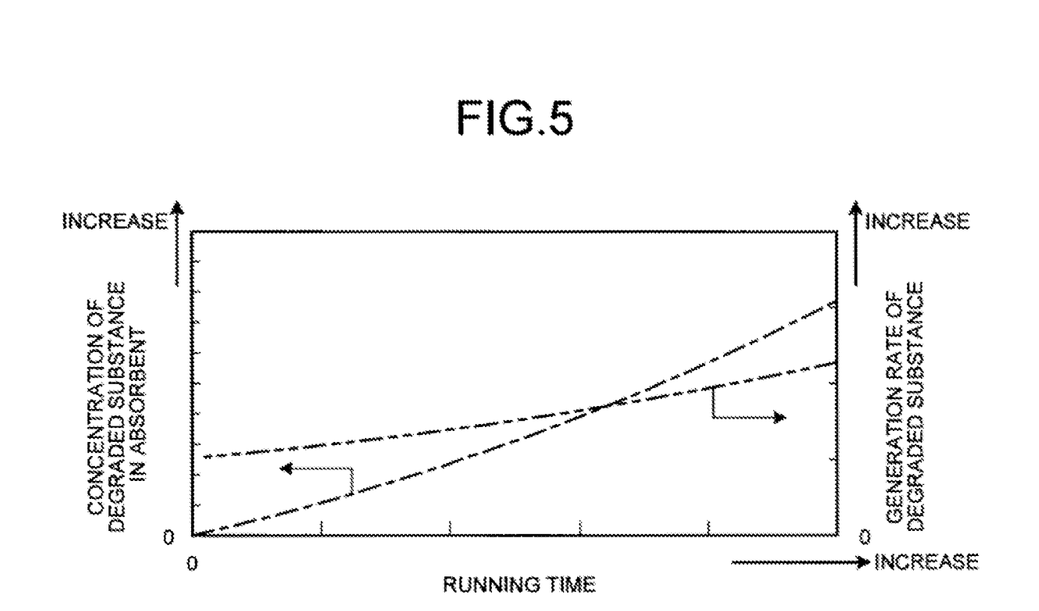
FIG. 5 is a diagram illustrating the relation between the lapse of running time of a reclaiming device (horizontal axis), the concentration of a degraded substance in an absorbent (left vertical axis), and the production rate of the degraded substance (right vertical axis).

FIG. 5 is a diagram illustrating the relation between the lapse of running time of the reclaiming device (horizontal axis), the concentration of the degraded substance in the absorbent (left vertical axis), and the production rate of the degraded substance (right vertical axis).

As illustrated in FIG. 5, the degraded substance accumulates in the absorbent with the lapse of running time, the degraded substance itself causes the generation of a new degraded substance, and thus the generation rate of the degraded substance increases and the concentration of the degraded substance increases more and more.

In the present Embodiment, the absorbent component is firstly recovered through vaporization in the evaporator 51 and the ionic degraded substance is then continuously removed in the ionic degraded substance removal section (electrodialysis device 56A) 56, and thus it is possible to manage the concentration of the degraded substance at a low concentration, as a result, the accumulation of the degraded substance is eliminated, whereby the total amount of the degraded substance to be removed can be decreased.

Figure 6:
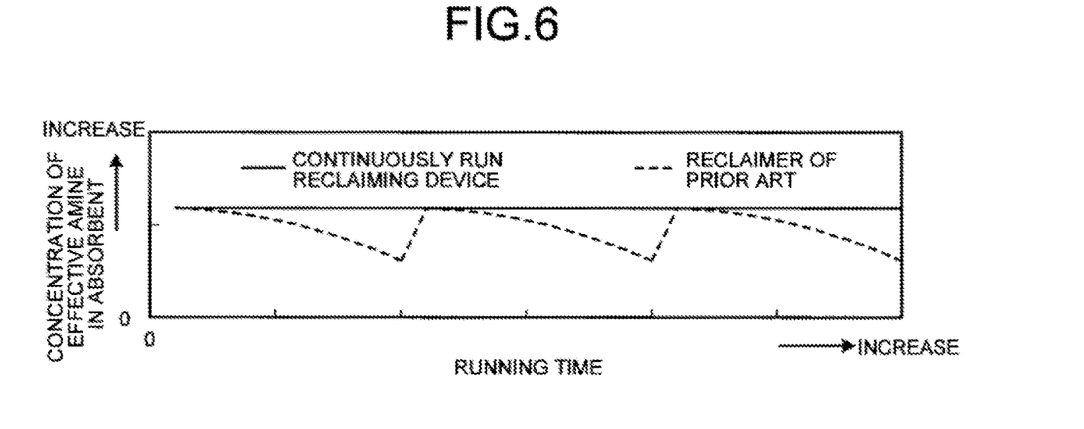
FIG. 6 is a diagram illustrating the relation between the lapse of running time of a reclaiming device (horizontal axis) and the concentration of an effective amine in the absorbent.
Figure 7:
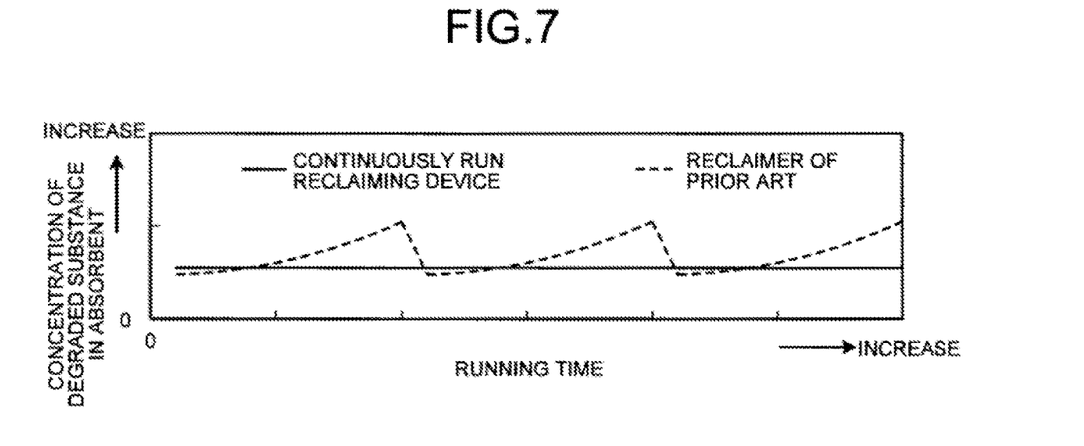
FIG. 7 is a diagram illustrating the relation between the lapse of running time of a reclaiming device (horizontal axis) and the concentration of a degraded substance in the absorbent.

FIG. 6 is a diagram illustrating the relation between the lapse of running time of the reclaiming device (horizontal axis) and the concentration of an effective amine in the absorbent. In addition, FIG. 7 is a diagram illustrating the relation between the lapse of running time of the reclaiming device (horizontal axis) and the concentration of the degraded substance in the absorbent.

In the conventional reclaiming treatment by a batch processing (indicated by a broken line in the drawing), the properties (absorption capacity, viscosity, surface tension, and the like) of the absorbent change at a constant rate.

In contrast, the continuous running of the reclaiming device which has been impossible in the prior art is possible in the present Embodiment, and thus as indicated by the solid line in the drawing, it is possible to constantly maintain the properties of the absorbent. As a result, it is possible to more stably run the $CO_2$ recovery unit 10.

Embodiment 2

Figure 3:
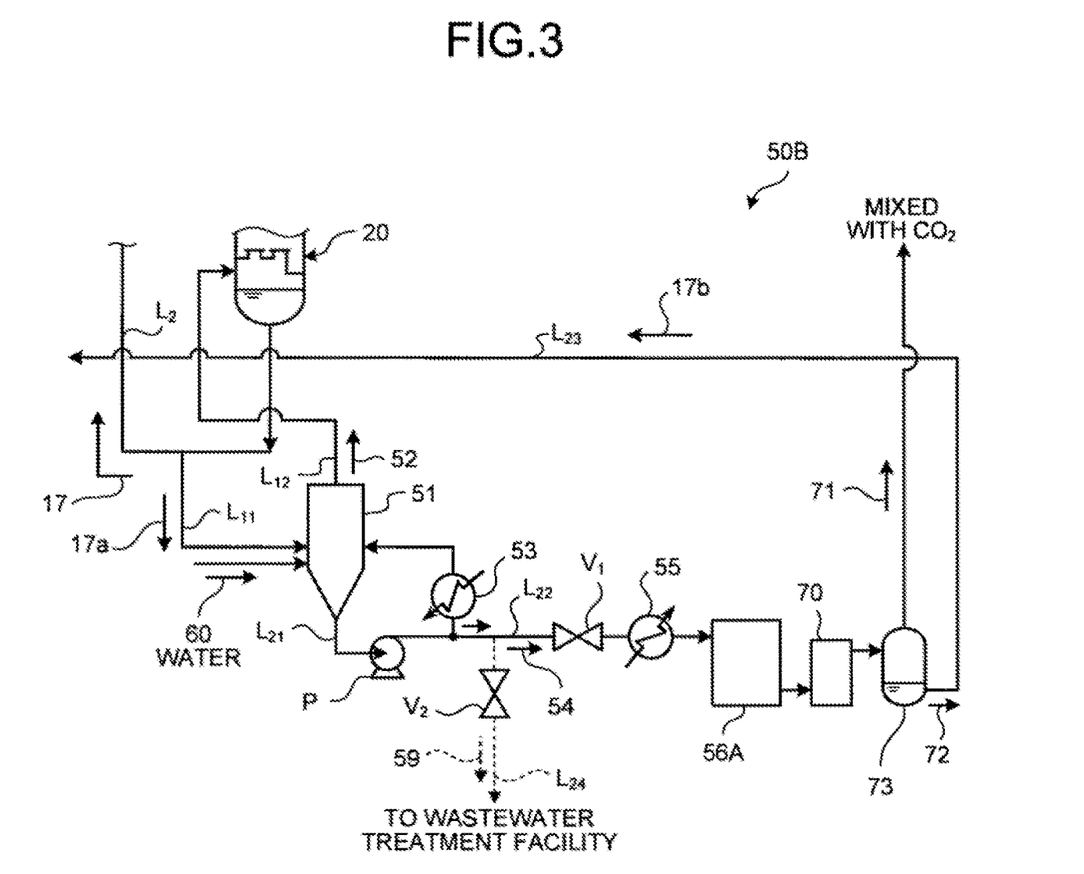
FIG. 3 is a schematic diagram of a reclaiming device according to Embodiment 2.

FIG. 3 is a schematic diagram of the reclaiming device according to Embodiment 2. The same configuration as in Embodiment 1 is denoted by the same reference sign, and the duplicate description thereof will be not provided.

As illustrated in FIG. 3, a reclaiming device 50B according to the present Embodiment is equipped with an ultraviolet irradiation section 70 to decompose the nonionic degraded substance, which is provided downstream of the electrodialysis device 56A and a gas-liquid separation section 73 to separate a gas component 71 of the decomposition product of the nonionic degraded substance decomposed in the ultraviolet irradiation section 70 from a liquid component 72 containing the absorbent.

The nonionic degraded substance that is not removed in the electrodialysis device 56A is decomposed by ultraviolet light in the ultraviolet irradiation section 70 and the gas component 71 is separated. Thereafter, the gas component is mixed with, for example, $CO_2$ discharged from the absorbent regenerator 20 and discharged.

Here, an effective amine component is also decomposed to be lost when the absorbent 17 is treated in the ultraviolet irradiation section as it is immediately after being branched off to the branch line. Hence, it is possible to efficiently decompose only the nonionic degraded substance after most of the absorbent component is removed in the evaporator 51 since the absorbent component such as the effective amine or the ionic degraded substance is almost not contained in the liquid which passes through the ultraviolet irradiation section 70.

According to the present Embodiment, the loss of the absorbent component decreases and the nonionic degraded substance is also decomposed, and thus it is possible to eliminate the generation of sludge containing an organic waste.

Embodiment 3

Figure 4:
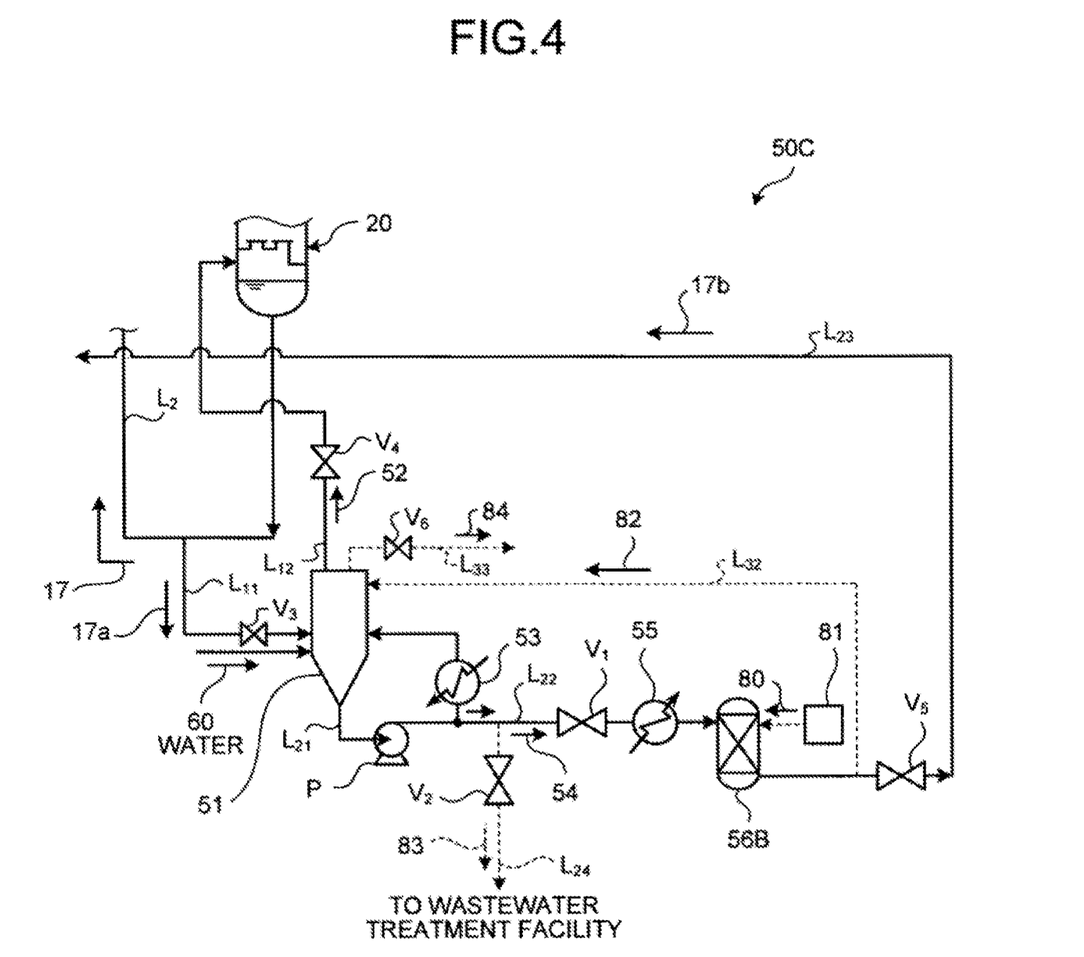
FIG. 4 is a schematic diagram of a reclaiming device according to Embodiment 3.

FIG. 4 is a schematic diagram of the reclaiming device according to Embodiment 3. The same configuration as in Embodiment 1 is denoted by the same reference sign, and the duplicate description thereof will be not provided.

As illustrated in FIG. 4, a reclaiming device 50C according to the present Embodiment is the case of using an ion exchange resin device 56B as the ionic degraded substance removal section 56.

The electrodialysis device 56A is used in Embodiment 1, but in the present Embodiment, the concentration of the ionic degraded substance in the system is maintained to be low by the ion exchange resin device 56B. This makes it possible to suppress an excessive increase in boiling point due to the accumulation of the degraded substance in the evaporator 51. Hence, the present reclaiming device can be continuously run unlike the conventional kettle type reclaiming device.

Removal Operation of Nonionic Degraded Substance

Here, when the nonionic degraded substance which cannot be removed in the ion exchange resin device 56B is accumulated, the first on-off valve $V_1$ in front of the cooler 55 is closed, only the evaporator 51 is run, and the nonionic degraded substance can be removed from the process by the same operation as in Embodiment 1 as concentrated waste water 83.

Regeneration Operation of Ion Exchange Resin

Next, when the processing capability of ion removal of the ion exchange resin device 56B has decreased, a regenerating chemical 80 is introduced into the ion exchange resin device 56B from a chemical introduction section 81, and a discharge line $L_{32}$ of a resin-regenerated waste liquid 82 due to this administration is connected to the evaporator 51. This makes it possible to use the evaporator 51 as a device to concentrate and decrease the volume of the waste liquid containing the regenerating chemical 80.

In addition, a general purpose device can be used without being particularly modified as the ion exchange resin device 56B.

In addition, those that cannot be removed in the ion exchange resin device 56B in principle can be separately concentrated and removed in the evaporator 51 as the nonionic degraded substance by the same operation as in Embodiment 1.

In addition, in the case of regenerating the ion exchange resin device 56B with a chemical, a great amount of effluent generated in the regeneration is discharged conventionally, but it is possible to significantly cut down the cost for wastewater treatment by decreasing the volume of the resin-regenerated waste liquid 82 to be generated in the regeneration of the ion exchange resin device 56B by the evaporator 51.

In other words, in a case where the degradation of the ion exchange resin device 56B is confirmed, the introduction of the absorbent 17 is stopped by closing a third on-off valve $V_3$ interposed on the introduction line $L_{11}$.

In addition, a fourth on-off valve $V_4$ installed to the recovery steam discharge line $L_{12}$ which returns the absorbent to the regenerator 20 side by being interposed is closed. In addition, a fifth on-off valve $V_5$ interposed on the purified absorbent discharge line $L_{23}$ is closed to stop the discharge of the absorbent as the purified absorbent 17b. In addition, the first on-off valve $V_1$ provided upstream of the cooler 55 is kept closed.

Next, the regenerating chemical 81 is introduced into the ion exchange resin device 56B and the resin-regenerated waste liquid 82 is introduce into the evaporator 51. Thereafter, the resin-regenerated waste liquid 82 is concentrated by being circulated through the circulation line $L_{21}$. The concentration is completed when a predetermined amount of the resin-regenerated waste liquid 82 is obtained, thereafter, the second on-off valve $V_2$ interposed on the concentrated waste water line $L_{24}$ is opened, and the concentrated waste water 83 of which the concentration is completed is discharged, introduced into a separately provided wastewater treatment facility, and subjected to the wastewater treatment here.

Incidentally, a flue gas line $L_{33}$ with a sixth on-off valve $V_6$ is provided at the top of the evaporator 51, and waste steam 84 to be generated at the time of the concentration of resin-regenerated waste liquid 82 is discharged by opening the sixth on-off valve $V_6$ or sent to the absorber.

REFERENCE SIGNS LIST

10 $CO_2$ RECOVERY UNIT
50A to 50C RECLAIMING DEVICE
51 EVAPORATOR
52 RECOVERY STEAM
53 HEATING SECTION
54 CONCENTRATE
55 COOLER
56 IONIC DEGRADED SUBSTANCE REMOVAL SECTION
59 CONCENTRATED WASTE WATER

The invention claimed is:

1. A reclaiming method comprising:
conducting evaporation by introducing a part of an absorbent to recover $CO_2$ or $H_2S$ in a gas in a recovery unit into an evaporator and heating and concentrating the part of the absorbent to obtain recovery steam containing the absorbent and $CO_2$ or $H_2S$ and concentrate;
discharging the recovery steam from a top of the evaporator;
drawing off and supplying the concentrate from a bottom side of the evaporator;
removing an ionic degraded substance by cooling the concentrate supplied from the evaporator and removing the ionic degraded substance contained in the concentrate after the cooling to obtain a purified concentrate; and
reusing purified concentrate as a purified absorbent in the recovery unit.

2. The reclaiming method according to claim 1, wherein in the removing the ionic degraded substance, electrodialysis or an ion exchange resin is used.

3. The reclaiming method according to claim 2, wherein, in the removing the ionic degraded substance, the ion exchange resin is used,
the ion exchange resin is regenerated by introducing a regenerating chemical into the ion exchange resin and concentrating a resin-regenerated waste liquid obtained by regenerating the ion exchange resin with the introduced chemical on the evaporator side.

4. The reclaiming method according to claim 1, comprising irradiating an ultraviolet light to decompose a nonionic degraded substance contained in the concentrate after removing the ionic degraded substance.

\* \* \* \* \*